US010310132B2

(12) United States Patent
Carroll

(10) Patent No.: US 10,310,132 B2
(45) Date of Patent: Jun. 4, 2019

(54) ABSOLUTE VECTOR GRAVIMETER AND METHODS OF MEASURING AN ABSOLUTE GRAVITY VECTOR

(71) Applicant: Gedex Systems Inc., Mississauga (CA)

(72) Inventor: Kieran A. Carroll, Brampton (CA)

(73) Assignee: Gedex Systems Inc., Mississauga (CA)

( * ) Notice: Subject to any disclaimer, the term of this patent is extended or adjusted under 35 U.S.C. 154(b) by 629 days.

(21) Appl. No.: 14/672,808

(22) Filed: Mar. 30, 2015

(65) Prior Publication Data

US 2015/0276975 A1    Oct. 1, 2015

Related U.S. Application Data

(60) Provisional application No. 61/971,885, filed on Mar. 28, 2014.

(51) Int. Cl.
*G01V 7/02*    (2006.01)
*G01V 7/06*    (2006.01)
*G01V 3/18*    (2006.01)

(52) U.S. Cl.
CPC ..................... *G01V 7/02* (2013.01)

(58) Field of Classification Search
CPC ........................................ G01V 7/02
See application file for complete search history.

(56) References Cited

U.S. PATENT DOCUMENTS

| | | | |
|---|---|---|---|
| 4,749,157 A | 6/1988 | Neufield | |
| 4,935,883 A | 6/1990 | Hulsing, II | |
| 5,357,802 A * | 10/1994 | Hofmeyer | G01V 7/00 73/382 G |
| 5,970,787 A * | 10/1999 | Wignall | G01V 7/16 73/152.54 |
| 6,125,698 A * | 10/2000 | Schweitzer | E21B 43/16 702/2 |
| 6,898,970 B2 | 5/2005 | Bertis | |
| 2005/0022402 A1* | 2/2005 | Ash | E21B 47/022 33/321 |
| 2007/0205331 A1 | 9/2007 | Janhunen | |
| 2010/0064767 A1* | 3/2010 | Rice | G01P 15/08 73/1.79 |
| 2010/0145620 A1* | 6/2010 | Georgi | G01P 15/093 702/6 |

(Continued)

OTHER PUBLICATIONS

Extended European Search Report for European Application No. 15768304.6, dated Sep. 21, 2017 (Date of completion of the search: Sep. 12, 2017).
International Search Report and the Written Opinion of the International Searching Authority for PCT Application No. PCT/CA2016/050068, dated Jan. 28, 2016, 8 pages.
Encyclopedia of Solid Earth Geophysics, edited by Gupta, published by Springer in 2011; pp. 449-497.

(Continued)

*Primary Examiner* — Moazzam Hossain
(74) *Attorney, Agent, or Firm* — Bereskin & Parr LLP/S.E.N.C.R.L., s.r.l.

(57) ABSTRACT

An absolute vector gravimeter and method of use is provided. The absolute vector gravimeter includes one or more single axis accelerometers, each capable of pointing in at least two directions and calculating an estimated gravity component. Further embodiments provide for estimating a bias in the single axis accelerometer, as well as measuring non-ballistic accelerations along multiple axes and calculating estimated gravity components for each. A resultant non-ballistic acceleration vector can be calculated. Examples for reducing the RMS error in the estimated gravity components are also provided.

30 Claims, 6 Drawing Sheets

(56) References Cited

U.S. PATENT DOCUMENTS

| | | | |
|---|---|---|---|
| 2012/0210783 A1* | 8/2012 | Carroll | G01V 7/06 73/382 G |
| 2014/0007646 A1* | 1/2014 | Rodney | E21B 47/022 73/1.37 |
| 2015/0234086 A1* | 8/2015 | Kim | G01V 7/06 702/5 |

OTHER PUBLICATIONS

B. L. Adams et al., Precision Measurement of Satellite Acceleration: The LOGACS Experiment, Air Force Report No. SAMSO-TR-69-6, Aerospace Report No. TR-0200(4306-02)-5, 68 Jul. 15, pp. 1-37.

NASA SP-330, Apollo 17 Preliminary Science Report, National Aeronautics and Space Administratio, USA.

M.N. Nabighian et al., Historical Development of the Gravity method in Exploration, Geophysics, vol. 70, No. 6 (Nov.-Dec.); p. 63ND-89ND, 6 Figs., 10.1190/1.2133765.

Eric K. Sutton et al, A CubeSat Constellation to Investigate the Atmospheric Drag Environment, 24th Annual AIAA/USU Conference on Small Satellites.

Marci D. Pilinski et al., An Innovative Method for Measuring Drag on Small Satellites, 23rd Annual AIAA/USU Conference on Small Satellites.

International Search Report and the Written Opinion of the International Searching Authority for PCT Application No. PCT/CA2015/000191, dated Jul. 10, 2015, 9 pages.

International Preliminary Preliminary Report on Patentability for PCT Application No. PCT/CA2016/050068, dated Jun. 23, 2016.

* cited by examiner

ABSOLUTE VECTOR GRAVIMETER AND METHODS OF MEASURING AN ABSOLUTE GRAVITY VECTOR

CROSS-REFERENCE TO RELATED APPLICATIONS

This application claims the benefit of U.S. Provisional Patent Application No. 61/971,885 filed on Mar. 28, 2014 entitled "ABSOLUTE VECTOR GRAVIMETER", which is incorporated by reference herein in its entirety.

FIELD

The described embodiments relate to gravimeters, and more specifically, to a gravimeter for determining the local absolute, unbiased, gravity vector.

BACKGROUND

Gravimeters have an inherent measurement error, usually referred to as a bias, which in general drifts randomly over time. In well-built instruments the bias drifts slowly so that it is possible to complete a measurement, or sometimes several measurements, before the bias has drifted significantly. However, even when it is possible to take several measurements before the bias has drifted too far, comparing measurements taken at different times can require a complex scheme of calibrations.

SUMMARY

According to a first embodiment, an absolute vector gravimeter is provided. The gravimeter comprises a base and a first single axis gimbal operatively connected to the base, the first single axis gimbal being configured to slew through an angle of at least 2θ degrees, where θ is an angle having a value of greater than 0 degrees. A first single axis accelerometer is operatively connected to the first single axis gimbal. A processor is operatively connected to the first single axis gimbal and the first single axis accelerometer. The processor is configured to:

operate the first single axis gimbal to point the first single axis accelerometer in a first direction, wherein the first direction is at an angle of (90−θ) degrees from an axis of determination, wherein the axis of determination is defined in relation to an instrument-fixed reference frame;

operate the first single axis accelerometer to take a first measurement of a first component of a gravity vector, when pointed in the first direction;

operate the first single axis gimbal to point the first single axis accelerometer in a second direction, wherein the second direction is oriented at an angle of (90+θ) degrees from the axis of determination;

operate the first single axis accelerometer to take a second measurement of a second component of the gravity vector when pointed in the second direction, wherein the first and second measurements are static measurements; and use the first measurement and the second measurement to calculate a first estimated gravity component along the axis of determination.

In another embodiment, the second direction is oriented at an angle of 180 degrees to the first direction, wherein the first and second directions point in opposite directions along a first single axis of measurement, wherein the processor is further configured to use the first and second measurements to calculate a first estimated bias in the first single axis accelerometer.

In another embodiment, the processor is further configured to:

operate the first single axis gimbal to point the first single axis accelerometer in a third direction along a second axis of measurement, the second axis of measurement being perpendicular to the first axis of measurement;

operate the first single axis accelerometer to take a third measurement when pointed in the third direction; and use the third measurement and the first estimated bias to calculate a second estimated gravity component along the second axis of measurement.

In another embodiment, the absolute vector gravimeter further comprises:

a second single axis gimbal attached to the base and operatively connected to the processor, the second single axis gimbal being configured to slew through at least 180 degrees; and a second single axis accelerometer attached to the second single axis gimbal and operatively connected to the processor.

The processor is further configured to:

operate the second single axis gimbal to point the second single axis accelerometer in a fourth direction along a third axis of measurement;

operate the second single axis accelerometer to take a fourth measurement; when pointed in the fourth direction;

operate the second single axis gimbal to point the second single axis accelerometer in fifth direction along the third axis of measurement, wherein the fifth direction is oriented at an angle of 180 degrees to the fourth direction;

operate the second single axis accelerometer to take a fifth measurement when pointed in the fifth direction; and use the fourth measurement and the fifth measurement to calculate a third estimated gravity component along the third axis of measurement and to calculate a second estimated bias in the second single axis accelerometer.

In another embodiment, the processor is further configured to:

operate the second single axis gimbal to point the second single axis accelerometer in a sixth direction along a fourth axis of measurement, wherein the fourth axis of measurement is perpendicular to the third axis of measurement;

operate the second single axis accelerometer to take a sixth measurement when pointed in the sixth direction; and use the sixth measurement and the second estimated bias to calculate a fourth estimated gravity component along the fourth axis of measurement.

In another embodiment, the first measurement axis and the third measurement axis are co-axial, wherein the first estimated gravity component n and the third estimated gravity component provide redundant checks for one another.

In another embodiment, three of the measurement axes are perpendicular to each other, wherein the processor is configured to calculate an estimated gravity component along each of the 3 perpendicular axes, wherein the processor is configured to combine the estimated gravity components along each of the three perpendicular axes into a resultant acceleration vector.

In another embodiment, the processor is further configured to repeat each measurement a plurality of times and combine the estimated gravity components from all the measurement cycles, thereby reducing the effect of white noise on the estimated gravity components.

In another embodiment, the processor is connected to the first single axis accelerometer by a hard-wired connection, thereby limiting the range of angles through which the first single axis gimbal is capable of rotating.

In another embodiment, the absolute vector gravimeter further comprises an angle sensor for measuring at least one of the angular position of the first single axis accelerometer and angular speed of the first single axis accelerometer when the first single axis gimbal is slewing. The processor is further configured to:

operate the first single axis accelerometer to take a centripetal acceleration component measurement when the first single axis gimbal is stewing;

calculate an expected value of the centripetal acceleration component measurement using known geometric characteristics of the absolute vector gravimeter and an angle sensor measurement;

compare the centripetal acceleration component measurement to the expected value of the centripetal acceleration component measurement in order to obtain an end-to-end calibration for the gain of the absolute vector gravimeter; and correct the first measured acceleration using the end-to-end calibration.

According to another embodiment, an absolute vector gravimeter for measuring at least one component of a non-ballistic acceleration vector is provided. The absolute vector gravimeter comprises a base, a first single axis gimbal operatively connected to the base, a first single axis accelerometer operatively connected to the first single axis gimbal, and a processor operatively connected to the first single axis gimbal and to the first single axis accelerometer. The processor is connected to the first single axis accelerometer by a first hard-wired connection. The processor is configured to:

operate the first single axis gimbal and the first single axis accelerometer to slew to at least three different first accelerometer orientations in a first plane and take a static co-planar measurement at each of the at least three first accelerometer orientations; and using the measurements, calculate a first estimated gravity vector component along each of two in-plane perpendicular axes in the first plane, and an estimated bias in the first single axis accelerometer.

In another embodiment, the at least three measurements are distributed evenly around 360 degrees.

In another embodiment, the processor is configured to calculate the estimated bias and the corrected measured acceleration along the two in-plane axes by fitting a model acceleration signal to the at least three measurements.

In another embodiment, the hard-wired connection constrains a range of motion of the first single axis gimbal to no more than 360 degrees.

In another embodiment, the absolute vector gravimeter further comprises:

a second single axis gimbal operatively connected to the base and operatively connected to the processor; and a second single axis accelerometer operatively connected to the second single axis gimbal and connected to the processor by a second hard-wired connection.

The processor is operatively connected to the second single axis gimbal and to the second single axis accelerometer, wherein the processor is connected to the second single axis accelerometer is by a second hard-wired connection, and where the processor is further configured to:

operate the second single axis gimbal and the second single axis accelerometer to slew to at least three different second accelerometer orientations in a second plane and take a static co-planar measurement at each of the at least three second accelerometer orientations; and using the measurements taken in the at least three second accelerometer orientations, calculate a second estimated gravity vector component along each of two in-plane perpendicular axes in the second plane, and an estimated bias in the second single axis accelerometer.

According to another embodiment, a method of measuring at least one component of a non-ballistic acceleration vector is provided. The method comprises:

using a first single axis accelerometer to take a first measurement in a first direction, wherein the first direction is at an angle of (90−θ) degrees from an axis of determination, wherein the axis of determination is defined in relation to an instrument-fixed reference frame, where θ is an angle having a value of greater than 0 degrees;

using the first single axis accelerometer to take a second measurement in a second direction, wherein the second direction is oriented at an angle of (90+θ) degrees from the axis of determination; and using the first and second measurements to calculate an estimated gravity component along the axis of determination.

In another embodiment, the second direction is oriented at an angle of 180 degrees to the first direction, wherein the first and second directions point in opposite directions along a first single axis of measurement, the method further comprising using the first and second measurements to calculate a first estimated bias in the first single axis accelerometer.

In another embodiment, the method further comprises:

using the first single axis accelerometer to take a third measurement in a third direction along a second axis of measurement, wherein the second axis of measurement is perpendicular to the first axis of measurement; and using the third measurement and the first estimated bias to calculate a second estimated gravity component along the second axis of measurement.

In another embodiment, the method further comprises:

using a second single axis accelerometer to take a fourth measurement in a fourth direction along a third axis of measurement;

using the second single axis accelerometer to take a fifth measurement in a fifth direction along the third axis of measurement, wherein the fifth direction is oriented at an angle of 180 degrees to the fourth direction; and using the fourth and fifth measurements to calculate a second estimated bias in the second single axis accelerometer and a third estimated gravity component along the third axis of measurement.

In another embodiment, the method further comprises:

using the second single axis accelerometer to take a sixth measurement in a sixth direction along a fourth axis of measurement, wherein the fourth axis of measurement is perpendicular to the third axis of measurement; and using the sixth measurement and the second estimated bias to calculate a fourth estimated gravity component along the fourth axis of measurement.

In another embodiment, three of the measurement axes are perpendicular to each other, the method further comprising calculating an estimated gravity component along each of the three perpendicular axes and combining the three estimated gravity components into a resultant estimated gravity vector.

In another embodiment, the method further comprises calculating a magnitude of the resultant estimated gravity vector by calculating the square root of the sum of the squares of the three estimated gravity components.

In another embodiment, the method further comprises repeating each measurement a plurality of times and combining the estimated gravity components from all the measurement cycles for the purpose of reducing the effect of white noise on the estimated gravity components.

In another embodiment, a method of measuring at least one component of a non-ballistic acceleration vector is provided. The method uses a processor operatively connected to a first single axis gimbal, and also connected to a first single axis accelerometer by a first hard-wired connection. The method comprises:

operating the first single axis gimbal and the first single axis accelerometer to slew to at least three different first accelerometer orientations in a first plane;

taking a static co-planar measurement at each of the at least three first accelerometer orientations; and using the measurements, calculate a first estimated gravity component along each of two in-plane perpendicular axes in the first plane, and an estimated bias in the first single axis accelerometer.

In another embodiment, a second single axis gimbal is provided. The second single axis gimbal is operatively connected to the base and operatively connected to the processor. A second single axis accelerometer is also provided, the second single axis accelerometer being operatively connected to the second single axis gimbal and connected to the processor by a second hard-wired connection. The method further comprises:

operating the second single axis gimbal and the second single axis accelerometer to slew to at least three different second accelerometer orientations in a second plane;

taking a static co-planar measurement at each of the at least three second accelerometer orientations; and using the measurements taken in the at least three second accelerometer orientations, calculate a second estimated gravity component along each of two in-plane perpendicular axes in the second plane, and an estimated bias in the second single axis accelerometer.

In another embodiment, a method of correcting for variations in the gain of an absolute vector gravimeter with a predetermined geometry is provided. The absolute vector gravimeter has a base, a gimbal mounted on the base, a processor attached to the base, and a first single axis accelerometer operatively connected to the gimbal. The first single axis accelerometer is connected to the processor by a hard-wired connection. The method comprises:

taking an acceleration measurement and a slew rate measurement of the first single axis accelerometer as the first single axis accelerometer changes orientation, wherein the acceleration measurement comprises a measured centripetal acceleration component;

calculating an expected value of the centripetal acceleration component using predetermined geometric characteristics of the first single axis accelerometer and the slew rate measurement; and comparing measured centripetal acceleration component to the expected centripetal acceleration component in order to obtain an end-to-end calibration of the gain of an absolute vector gravimeter.

In another embodiment, a method of measuring at least two co-planar components of a non-ballistic acceleration is provided. The method comprises:

positioning a first single axis accelerometer in at least three spaced apart co-planar orientations, the first single axis accelerometer having a sensitive axis, wherein the first single axis accelerometer operates with the sensitive axis confined to lie within a first plane;

the first single axis accelerometer taking a static measurement in each of the at least three orientations to produce a first set of measurements; and using the first set of measurements to calculate an estimated bias in the first single axis accelerometer and a first pair of estimated gravity vector components along two in-plane perpendicular axes.

In another embodiment, the calculating step further comprises fitting, a model acceleration signal to the first set of measurements.

In another embodiment, the method further comprises:

positioning a second single axis accelerometer in at least three spaced apart co-planar orientations, wherein the second single axis accelerometer operates with the sensitive axis of the second single axis accelerometer confined to lie within a second plane that is orthogonal to the first plane;

the second single axis accelerometer taking a static measurement in each of the a least three orientations to produce a second set of measurements; and using the second set of measurements to calculate an estimated bias in the second single axis accelerometer and a second pair of estimated gravity components along two in-plane perpendicular axes.

BRIEF DESCRIPTION OF THE DRAWINGS

For a better understanding of the described example embodiments and to show more clearly how they may be carried into effect, reference will now be made, by way of example, to the accompanying drawings in which.

DESCRIPTION OF EXEMPLARY EMBODIMENTS

Figures 1A, 1B:
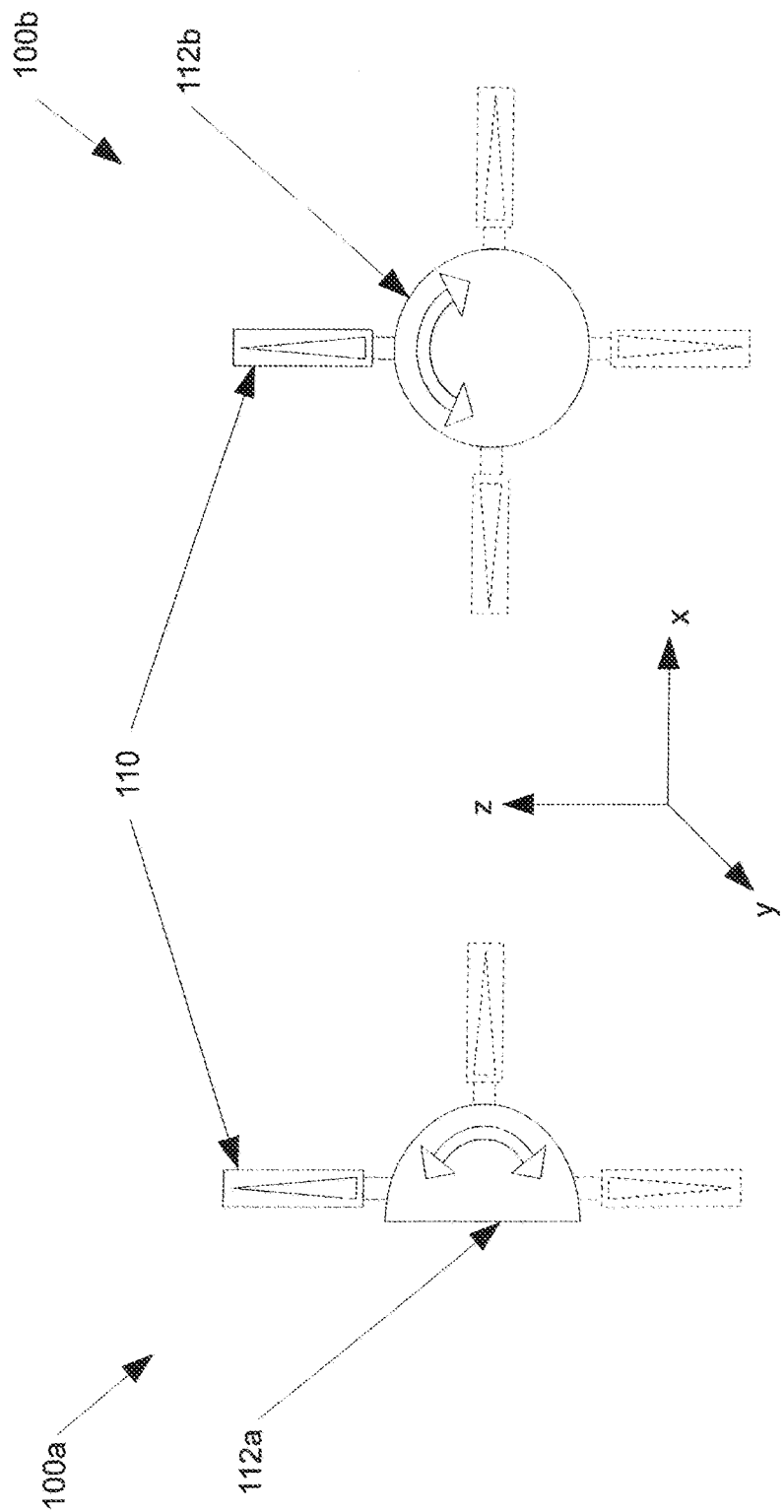
FIG. 1A shows a schematic representation of one embodiment of an absolute vector gravimeter with a single-axis accelerometer mounted on a single-axis gimbal.
FIG. 1B shows a schematic representation of another embodiment of an absolute vector gravimeter with a single-axis accelerometer mounted on a single-axis gimbal.

FIGS. 1A and 1B show schematic representations of two embodiments of an absolute vector gravimeter, 100*a* and 100*b* respectively, with a single-axis accelerometer mounted on a single-axis gimbal. The single-axis gimbal is mounted on a base (not shown). Those skilled in the art will appreciate that the base can be any member suitable for supporting the single-axis gimbal in the intended application. In FIG. 1A, single-axis accelerometer 110 is mounted to single-axis gimbal 112*a* with a 180 degree range of motion. In FIG. 1B, single-axis accelerometer 110 is mounted to single-axis gimbal 112*b* with a 360 degree range of motion. The mounting of single-axis accelerometer 110 on single-axis gimbal 112a, 112b allows the sensitive axis of single-axis accelerometer 110 to be pointed in opposite directions along one co-ordinate axis. For example, single-axis gimbal 112a, 112b is capable of pointing single-axis accelerometer 110 in the positive z direction and the negative z direction, as shown. In both cases, single-axis accelerometer 110 is operationally connected to a processor (not shown) for processing the output of single-axis accelerometer 110 as described below to arrive at an unbiased value for the component of the local gravity vector along the axis of measurement.

It should be noted that the instrument described here measures a non-ballistic acceleration. For example, an absolute vector gravimeter 100 in free-fall would measure zero because it would be following a ballistic trajectory, while the same absolute vector gravimeter 100 sitting on the surface of the Earth would measure the surface gravity at that location (with additional small contributions from the planet's rotation and gravitational effects from other small and/or distant bodies) because, being motionless on the surface, its actual acceleration is equal to the negative of the ballistic acceleration at that location. As another example, the same absolute vector gravimeter located in a spacecraft in flight while being accelerated by a propulsion system would measure the acceleration imparted by the operation of the propulsion system. Put another way, absolute vector gravimeter 100 measures the difference between the local specific force due to gravity (local gravitational acceleration) and the instrument's actual acceleration with respect to an inertial reference frame. References to measuring an acceleration vector and measuring a gravity vector and measuring a non-ballistic acceleration vector are generally used interchangeably herein, and each one encompasses the other. Accordingly, when the absolute vector gravimeter 100 is described as measuring the local gravity vector it is understood that the instrument is stationary on the surface of a planet or other celestial body.

Single-axis accelerometer 110 can be any suitable device chosen for its desired sensitivity and ability to operate effectively in the environment in which it is expected to be used. For example, it has been found that a Q-Flex QA2000, by Honeywell™ provides good sensitivity and is expected to be able to perform adequately in terrestrial and space applications.

Single-axis gimbal 112a, 112b can be any mechanical gimbal chosen for its ability to operate under expected environmental conditions provided that it is capable of repeatedly slewing through a selected angle and holding single axis accelerometer 110 steady while measurements are taken. Although the embodiments described herein are operable when the selected angle is as small as 60 degrees or less, it has been found that the best performance is obtained when the selected angle is at least 180 degrees. More complex modelling may be required for angles other than 180 degrees and will be discussed below in reference to FIG. 5. Accordingly, it is preferred that single axis gimbal 112a, 112b is capable of repeatedly slewing through at least 180 degrees and maintaining single-axis accelerometer 110 aligned with the measurement axis in each of two opposite directions for the duration of each measurement.

Processor (not shown) can be any suitable device for carrying out the required calculations and issuing the required commands, as described below. The processor can be a dedicated hardware device, such as a computer chip, or it may be a software implementation on a general purpose computer. The processor can be a single unit located in proximity to the base of the instrument or be implemented in a distributed system with components in different locations connected via a network or other means for communicating measurements. For example, the component of the processor "on board" may function only for data gathering and controlling the instrument while the raw signal is transmitted elsewhere for additional post processing and analysis. In another example, the measurement data may be collected locally and stored on a storage medium (such as a DVD or a flash drive), and then transported to another computer. Such an example implementation may be utilized in a lab testing or terrestrial surveying application.

The simplest, preferred embodiment will be described first while a discussion of the more complex, general case can be found below. In the simplest preferred embodiment, one operational measurement cycle comprises:

Slew the gimbal to align the single-axis accelerometer with a chosen positive measurement axis, for example the +z axis direction in FIG. 1A;

Measure the accelerometer's signal while pointed in that first direction;

Slew the gimbal 180 degrees to align the single-axis accelerometer with the negative measurement axis, for example the −z axis direction in FIG. 1A; and Measure the accelerometer's signal while pointed in that second direction;

Estimate bias by adding the above two measurements and dividing by two;

Estimate gravity along the positive measurement axis by subtracting the second measurement from the first measurement and dividing that difference by two;

Each measurement cycle generates a measurement pair consisting of one measurement along each of the chosen positive and negative measurement axes. A single measurement pair is sufficient to estimate the current value of the bias of single-axis accelerometer 110 and correct the measured value of the component of the local gravity vector along the measurement axis to a degree of accuracy limited by the rate of drift of the bias and the white noise in the system. In particular, the first measurement includes the accelerometer bias plus the component of the gravity vector in the first direction (the positive measurement axis), plus an error due to noise; while the second measurement includes the accelerometer bias minus the component of the gravity vector in the first direction (the positive measurement axis), plus a (different) error due to noise. Thus one-half of the sum of the two measurements is equal to the accelerometer's bias (plus effects due to noise), while one-half of the difference between the two measurements is equal to the component of the local gravity vector along the measurement axis (plus effects due to noise). More generally, the component of gravity along an axis of determination (where the axis of determination is a direction along which a component of the gravity vector will be estimated) can be estimated by making two measurements, the first at a gimbal angle (90−θ) degrees from the axis of determination, where θ is some angle greater than zero degrees, and the second at a gimbal angle (90+θ) degrees from the axis of determination, then subtracting the second measurement from the first measurement, then dividing that difference by the two times the sine of θ; with only 2 measurements, however, the value of the bias can only be independently determined if θ=90 degrees (corresponding to the simplest, preferred embodiment described above). Within a single measurement cycle, longer measurement times in each orientation will help to limit the effect of "white noise" on the measurement but at the cost of increasing errors due to bias drift while shorter measurement times will help to limit the errors due to bias drift but at the cost of increasing the root mean square (RMS) value of the error due to white noise.

This approach has the effect of measuring one component of the local gravity vector, projected onto a reference frame that is fixed with respect to the instrument's base. This approach does not require that the instrument-fixed reference frame be aligned to have one of its axes parallel to the direction of the local gravity vector, as is the case with some prior-art gimbaled accelerometer instruments. This may significantly simplify the gimbal design, and may confer operational advantages when operating this instrument in the field. The same may be true for the further embodiments described subsequently.

Figure 2:
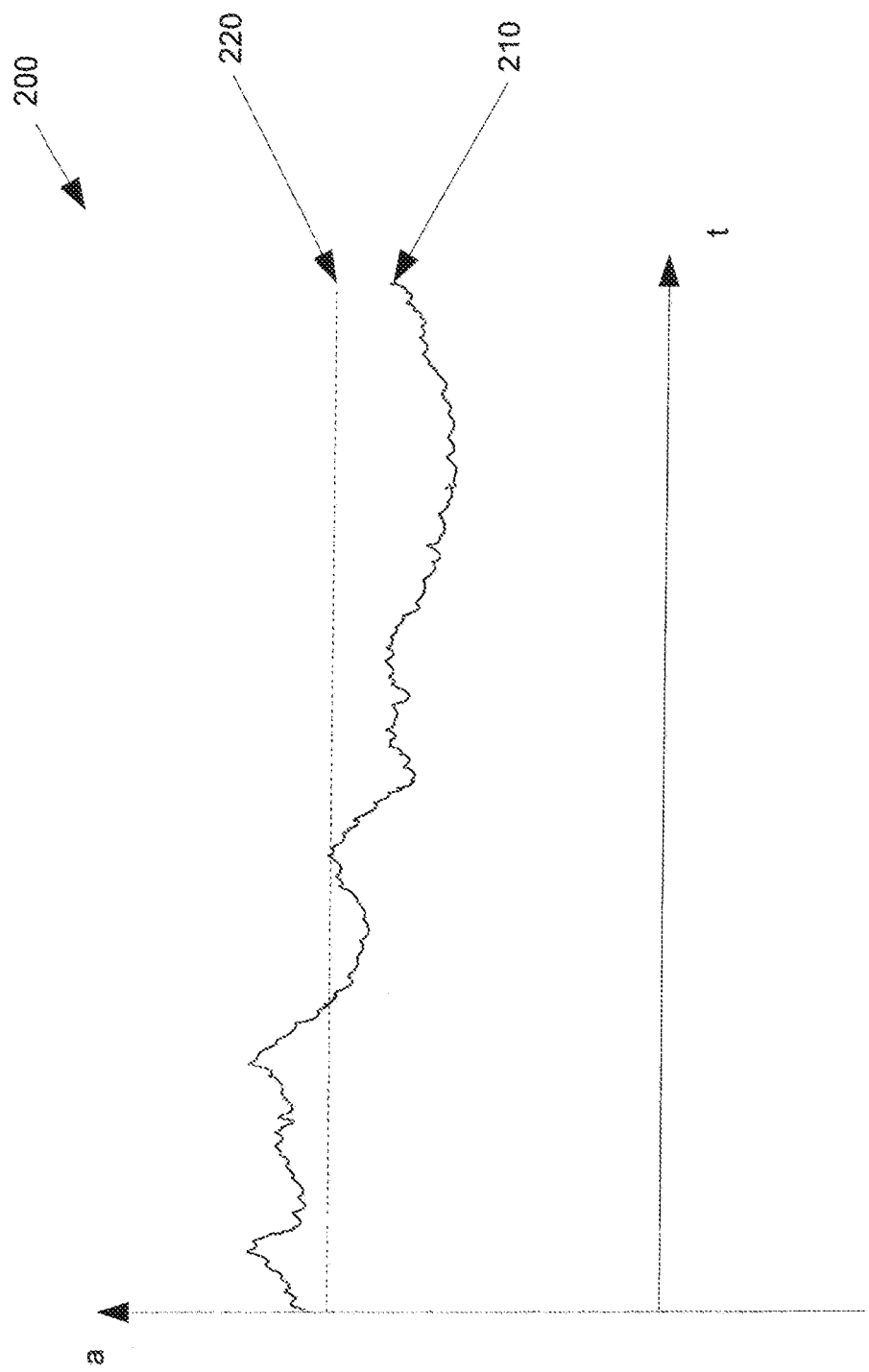
FIG. 2 is a graph of an example output signal of an accelerometer in the time domain.

FIG. 2 is a graph 200 of a typical output signal of an accelerometer in the time domain. The output signal 210 can be thought of as comprising three components: the true value of the local gravity vector's projection along the axis of measurement as well as a "white noise" component, that is essentially independent of frequency, and a "red noise" component (sometimes also known as "coloured noise") that is frequency dependent. The true value is shown by the dashed line 220 and is constant over the measurement interval. The red noise component is due mainly to the drifting bias of single-axis accelerometer 110 and is seen as the long wavelength change over time. The white noise component is seen as random, short wavelength variations.

Figure 3:
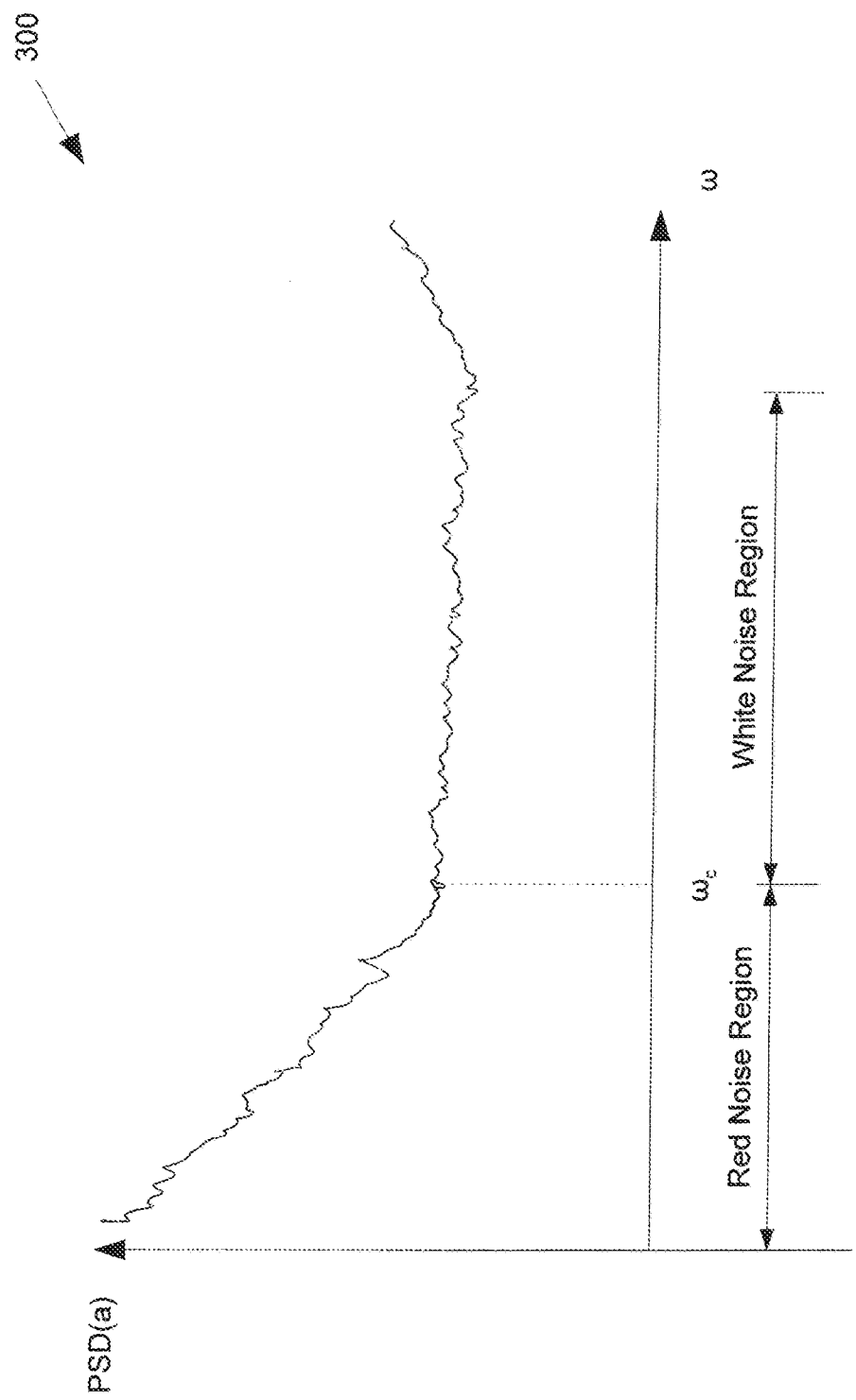
FIG. 3 is an example power spectral density graph of an example output signal of an accelerometer in the frequency domain.

FIG. 3 shows a typical power spectral density (PSD) graph 300 of the output of an accelerometer in the frequency domain. The graph contains a red noise region and a white noise region with a transition that occurs at a cut-of frequency, $\omega_c$. In the red noise region, the drifting bias in single-axis accelerometer 110 is the dominant form of noise, resulting in an increase in the error as frequency decreases. In the white noise region smaller random variations that do not contribute to drifting bias are the dominant form of noise. As the length of a measurement gets longer and approaches $t_c=1/\omega_c$, errors due to the drifting bias begin to dominate over errors due to the white noise. Instruments are designed to operate within the white noise region where the noise in the signal is most easily quantifiable and $t_c$ represents an approximate cap on the length of a single useful measurement.

If an accelerometer were hypothetically to exhibit only white noise, and to not exhibit red noise, then the RMS error in the measured acceleration could be made as small as one desires—i.e., the acceleration measurement could be made as accurate as one desires—by increasing the length of time over which the measurement is taken, and decreasing the bandwidth of a low-pass filter used to process the measurement. Alternately, the same could be accomplished by taking an increasingly large number of brief measurements, each of which has a larger RMS error than desired, then averaging these measurements together, with the RMS error of the averaged measurement decreasing with the square-root of the number of measurements. However, the presence of red noise interferes with this objective, having the effect of causing errors which can be relatively large when long, low-frequency measurements are made, or when a large number of brief measurements are made over a long period of time, typically a period of time longer than $t_c$. Thus the presence of red noise in the accelerometer measurement makes it difficult to reduce the accuracy of an accelerometers measurement below some level.

To overcome this difficulty, an absolute vector gravimeter in its simplest mode carries out at least two measurement cycles, preferably many more than two, as discussed in more detail below. Carrying out multiple measurement cycles allows each individual measurement to be of a short duration to limit the effect of bias drift, but compensates for the increased errors due to white noise on any single measurement by carrying out multiple measurement cycles. Synchronous demodulation of multiple measurement pairs collected over multiple measurement cycles in this way yields an estimate of the local gravity vector along the measurement axis where the error in the estimate is dominated by white noise, rather than by drifting bias. As such, the error in this measurement can be made arbitrarily small by increasing the number of measurement cycles and filtering the output signal to a lower bandwidth.

For example, if t is the length of one static measurement and n is the number of measurement cycles then (neglecting for the moment the time taken to slew between measurement orientations) T=2nt is the total measurement time and the lowest bandwidth to which the output can be filtered is approximately 1/T. As used herein, "static measurement" means a signal measured from the accelerometer when the gimbal is not rotating relative to the base. Since the RMS error is dominated by white noise, it will vary with the inverse square root of T, and so the RMS error can be made smaller by increasing the number of measurement cycles, n:

$$RMS \text{ Noise} \sim \frac{1}{\sqrt{T}} = \frac{1}{\sqrt{2nt}}$$

It has been found that results are better when the instrument is operated at a measurement cycle frequency, $\omega=\frac{1}{2}t$, that is significantly greater than the cut-off frequency, $\omega_c$, such as $\omega \geq 2\omega_c$. Accordingly, the number of cycles for a desired amount of RMS noise can be calculated. (Similar results hold true when the time taken to slew between measurement orientations is taken into account.)

The cut-off frequency also constrains the design of gimbal 112, and more specifically the slew rate of gimbal 112. The absolute vector gravimeter must be able to complete one measurement cycle before the bias wanders far enough to introduce a significant amount of error in the measurements. Accordingly, gimbal 112 is chosen so that the amount of time per cycle spent stewing is small compared to $t_c=1/\omega_c$, otherwise there may not be time to complete both measurements before the bias has drifted too far. Preferably, the amount of time per cycle spent slewing is less than half of $t_c$.

Accordingly, a preferred method of measuring the projection of the local gravity vector along a measurement axis comprises:
a. Slew to align single-axis accelerometer with the positive measurement axis, for example the +z axis direction in FIG. 1A;
b. Measure the accelerometer's signal while pointed in that first direction;
c. Slew to align single-axis accelerometer with the negative measurement axis, for example the −z axis direction in FIG. 1A;
d. Measure the accelerometer's signal while pointed in that second direction;
e. Estimate bias for this cycle by adding the above two measurements and dividing by two;
f. Estimate gravity along the positive measurement axis for this cycle by subtracting the above two measurements and dividing by two;

g. Repeat steps a-f a number of times corresponding to a desired RMS error, and h. Calculate an overall estimate of the component of gravity along the positive measurement axis by averaging the estimated gravity from all of these cycles.

Additional components of the local gravity vector can be measured by taking static measurements at additional points along the range of single axis gimbal 112. For example, in order to measure the local gravity vector along the x-axis using the absolute vector gravimeter 100b as shown in FIG. 1B, single axis accelerometer 110 can be oriented along the positive and negative x-axes and the same calculation can be carried out.

In another embodiment, the absolute vector gravimeter of FIG. 1A can also be used to estimate the local gravity vector along the x-axis by measuring once along the positive x-axis and using the bias estimate from the most recent opposed measurements along the z-axis to correct the value. In particular, such a measurement includes the accelerometer bias plus the component of the gravity vector in the +x axis direction, plus an error due to noise; subtracting the previously-determined value of the bias from this produces a value equal to the component of the gravity vector in the +x axis direction (plus effects due to noise). In this case, one measurement cycle comprises:

Slew to align single-axis accelerometer with a first positive measurement axis, for example the +z axis direction in FIG. 1A;

Measure the accelerometer's signal while pointed in that first direction;

Slew to align single-axis accelerometer with the negative measurement axis, for example the −z axis direction in FIG. 1A;

Measure the accelerometer's signal while pointed in that second direction;

Estimate bias by adding the above two measurements and dividing by two;

Estimate gravity along, the rst positive measurement axis by subtracting the above two measurements and dividing by two;

Slew to align single-axis accelerometer with a second positive measurement axis that is perpendicular to the first positive measurement axis, for example the +x axis direction in FIG. 1A;

Measure the accelerometer's signal while pointed in that third direction, and

Estimate gravity along the second positive measurement axis by subtracting the bias estimate from that third measurement.

It will be appreciated that the order in which these steps are performed may vary and that repeating the measurements 2 or more times will again lead to a reduction in the RMS error. Also, improvements may be possible in some cases by also conducting similar operations, such as making measurements in both the positive and negative x directions and using those to update the accelerometer bias measurement.

In another embodiment, two single axis accelerometers can each be mounted on a single axis gimbal, with the two gimbals oriented so that their gimbal axes are orthogonal to each other. This will allow the calculation of all three spatial components of the local gravity vector by applying the preceding method to each of the x, y and z axes. For example, a first unit may take measurements along the x and z axes while a second unit takes measurements along the y and z axes. Note that the second unit may be operated such that it provides a redundant estimate of the gravity vector along one of the same measurement axes provided by the first unit (i.e. in the preceding example the z axis is measured by both units). Such redundancy may be used to check calibrations between units or combined to get a more accurate measurement along one axis.

In this embodiment, where 3 orthogonal components of the gravity vector in an instrument-fixed reference frame have been determined, then that gravity vector has been completely determined. In which case, the magnitude of the gravity vector can also be calculated; it is equal to the RMS value (i.e., the square root of the sum of the squares) of the 3 orthogonal gravity vector components. Unlike in standard terrestrial geophysical gravimetry instruments, this embodiment can determine the magnitude of the local gravity vector without the instrument having first to be levelled with respect to the direction of the local gravity vector. Instead, this embodiment intrinsically measures the complete gravity vector, from which the vector's magnitude can be derived, rather than only measuring the gravity field's magnitude when erected to be vertical, as most present instruments generally do.

In another embodiment, a single-axis accelerometer can be mounted on a two-axis gimbal and sequentially moved through orientations along all three axes to calculate all three spatial components of the local gravity vector. As with the previous embodiments, these measurements can be made in directions aligned with an instrument-fixed reference frame, which need not be aligned to have one of its axes parallel to the local gravity vector.

In another embodiment, single axis gimbal 112 may be configured to orient single axis accelerometer 110 in directions other than directly along orthogonal axes. For example, it is possible to derive a de-biased estimate of the local gravity vector along the z-axis and the x-axis by taking measurements at zero degrees, 120 degrees and 240 degrees from the positive z-axis in the xz-plane. These 3 measurements are referred to below as m1, m2 and m3, respectively. Each measurement comprises the bias plus the cosine of the measurement angle multiplied by the +z component of gravity plus the sine of the measurement angle multiplied by the +x component of gravity. It can then be shown that in this particular case the accelerometer bias can be estimated using the formula $(m1+m2+m3)/2$, the +x component of the gravity vector can be estimated using the formula $(m2-m3)/\sqrt{3}$, and the +z component of the gravity vector can be estimated using the formula $(m1-m2-m3)/2$. This is also possible by taking 3 measurements in 3 other directions, or by taking more than 3 measurements each in a different direction, in which case the mathematics of determining the accelerometer bias and the gravity vector components in the +z and +x directions is more complex, and generally is better approached by fitting the measurements to a signal model including a sinusoidal term, as discussed below. Two such single-axis gimbal units oriented so that their rotation axes are orthogonal may therefore be able to provide de-biased estimates of all three spatial components of the local gravity vector.

It should be noted here that an absolute vector gravimeter 100 can also be used to measure non-ballistic accelerations other than those due only to gravity. An absolute vector gravimeter 100 as described is suitable for measuring components of the local gravity vector to a high degree of accuracy because, for a stationary object, the local gravity vector is effectively unchanging over the course of the measurement. The ability of the instrument to properly measure other accelerations is subject to the same constraint. More specifically, an absolute vector gravimeter 100 is able to measure an acceleration to a high degree of accuracy as long as that acceleration does not change appreciably during the total length of time spent collecting measurements, T. Relatively long duration nearly-constant accelerations experienced by spacecraft using low-thrust methods of propulsion, such as ion thrusters or solar sails, are examples where an absolute vector gravimeter 100 may be suitable In a preferred embodiment, the data acquisition electronics, i.e. the processor, are located on the base and connected to the accelerometer(s) via a hard-wired connection, such as a cable wrap drum. It has been found that alternatives to passing power and data via a hard-wired connection introduces undesirable effects. For example, passing them through slip rings introduces measurement noise. For another example, passing them via completely wireless means necessitates locating the data acquisition electronics on the rotating stage, which constrains the size and type of those electronics and may introduce difficulties in controlling the temperature of those electronics, which in turn can increase measurement errors. Since it is possible to slew to any orientation of single axis accelerometer 110 within a 360 degree envelope and gimbals 112a, 112b do not need to perform more than one complete rotation, a set of wires that winds and unwinds as the gimbal(s) slew is the preferred connection.

Figure 4:
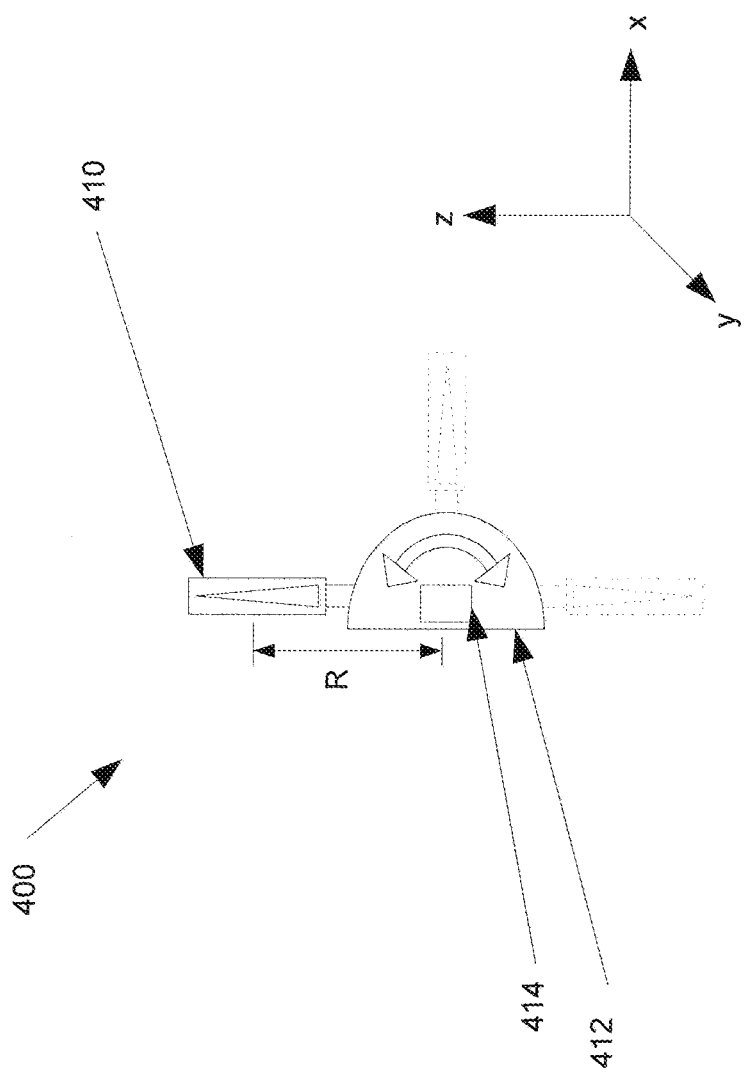
FIG. 4 shows a schematic representation of another embodiment of an absolute vector gravimeter with a single axis accelerometer mounted on a single axis gimbal incorporating an angle sensor.

FIG. 4 shows a schematic representation of another embodiment of an absolute vector gravimeter 400 with a single axis accelerometer mounted on a single axis gimbal incorporating an angle sensor 414. This embodiment is similar to that shown in FIG. 1A including a single axis accelerometer 410 mounted on a single axis gimbal 412. In addition, an angle sensor 414 is used to measure the angular position of single axis accelerometer 412 when stationary and while slewing. Angle sensor 414 can also be configured to measure the angular speed, or slew rate, of single axis accelerometer 410 directly. Those skilled in the art will appreciate that, in an alternative embodiment, multiple angle sensors may be provided, such as one sensor that measures angle and another sensor that measures angular rate.

In this embodiment, single axis accelerometer 410 takes measurements not only while stationary, but also while slewing, preferably but not necessarily at a constant angular speed, the total range of angular motion during such a slew being limited by the constraints imposed by the hard-wired connection between the accelerometer and the processor. Such measurements will include a centripetal acceleration component. If the physical characteristics of the instrument are well known, for example, they can be measured accurately before deployment, then the measured angular position and/or rate information can be combined with the known geometry to calculate an expected centripetal acceleration. Comparing the measured signal containing the centripetal acceleration component with the expected centripetal acceleration signal yields information about the end-to-end gain in the measurement system. This information can be used to correct acceleration values derived from the static measurements.

In particular, key geometric characteristics of the instrument can be predetermined. For example, a mathematical model of accelerometer 410 can be developed before deployment of absolute vector gravimeter 400 such that its physical characteristics are well known. For example, the distance R between the gimbal's axis of rotation and the accelerometer's centre of measurement can be measured. The distance R is an important geometric characteristic because centripetal acceleration depends on R in accordance with the formula: $a_c = R\omega^2$, where $\omega$ is the angular velocity of the rotating gimbal. The change in R with temperature can also be measured. Absolute vector gravimeter 400 will generally have a small, but repeatable error that depends on gimbal 412 angle. This could be due to many factors, including bearing imperfections and inaccuracy in angle sensor 414. This may be included in the instrument model (described in detail below) in order to improve the overall gain calibration.

For example, once a set of static measurements is complete they can be fitted to a sinusoidal signal model to estimate the gravity signal and the residual error as a function of angle. Afterwards, when processing the slew measurements, the gravity signal as a function of angle information is subtracted, removing the components due to the gravity signal and the angular error terms leaving the centripetal acceleration signal and the bias. This makes estimating the centripetal acceleration more accurate and results in a better end-to-end gain calibration.

Figure 5A:
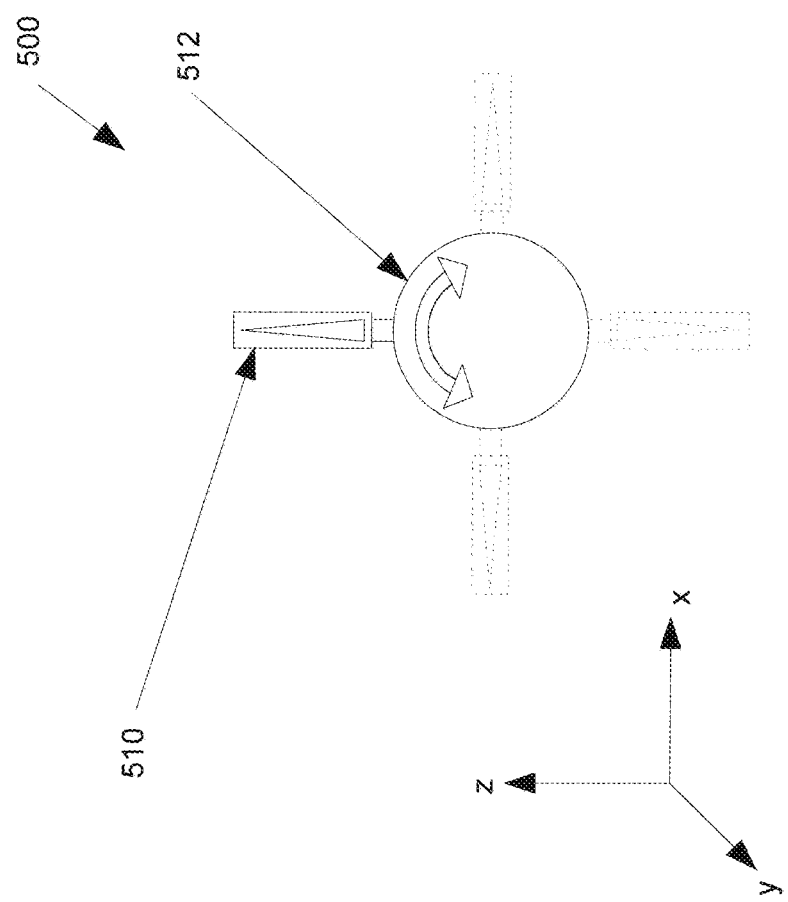
FIG. 5A shows a schematic representation of another embodiment of an absolute vector gravimeter with a single axis accelerometer mounted on a single axis gimbal.
Figure 5B:
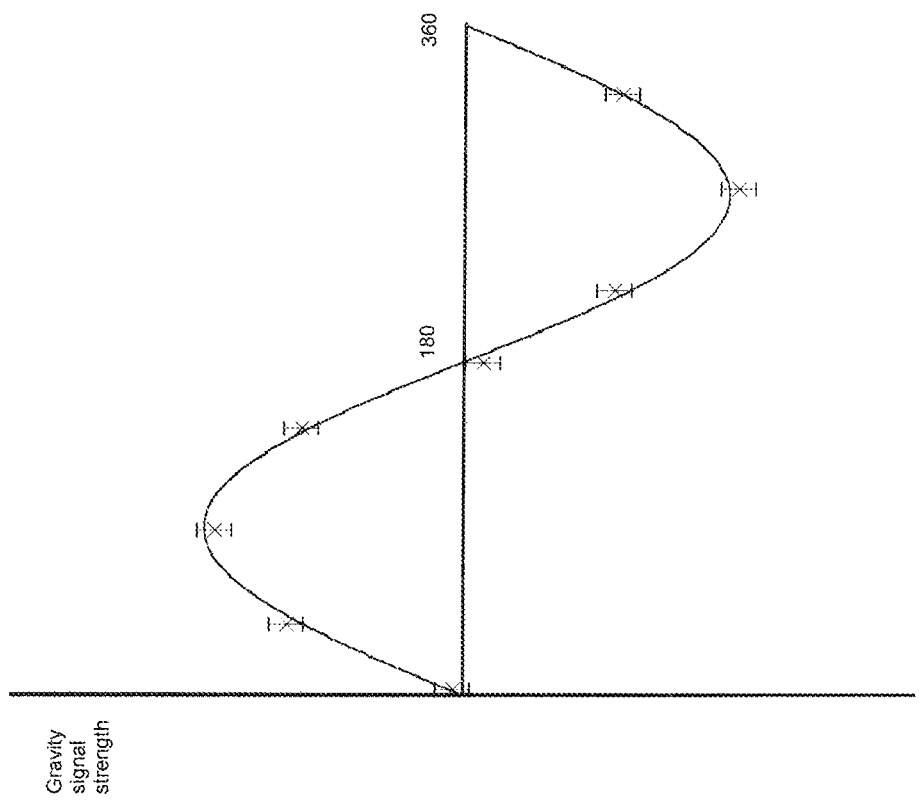
FIG. 5B shows a plot of a gravity signal v. measurement angle.

FIG. 5A shows a schematic representation of another embodiment of an absolute vector gravimeter 500 incorporating a single axis accelerometer 510 and 360 degree single axis gimbal 512. In this embodiment, finding corrected acceleration measurements is accomplished by model fitting. For example, gimbal 512 may move accelerometer 510 to point towards different static directions around a circle in the x-z plane, where a series of measurements is taken resulting in a series of measured values for acceleration. For example, if the local gravity vector is aligned with the z-axis then the real gravity signal will vary sinusoidally with the angle of accelerometer 510 as shown in the solid line of FIG. 5B. If measurements are taken at several orientations in the 360 degree range of gimbal 512 and the results are plotted on the same graph it would appear as the points, including error bars, shown on FIG. 5B. In this example, 8 measurements are shown, but this embodiment will produce a result with as few as 3 measurements. The orientations for those measurements need not be evenly spaced. The measurements may all be within as little as 60 degrees or less of one another, although performance will improve with greater angular separation. Accordingly, a gimbal 512 capable of less than 360 degrees of rotation can be used. A similar result, including a sinusoidal component to the measured signal, may be obtained if the gravity vector is aligned in any other direction.

A model of the instrument can be developed that predicts an expected gravity signal curve given certain parameters and the measurement data can be fitted to it. Useful parameters have been found to include the tilt angle of gimbal 512 with respect to the local gravity field, and misalignment of the sensitive axis of accelerometer 510 with respect to the axis of gimbal 512. The number of measurements here functions much as the number of measurements does as described above: a greater number of measurements reduces the contribution of white noise in the same manner, $$RMS\ Noise \sim \frac{1}{\sqrt{n}}$$

In addition, the same speed constraints apply. The more quickly the entire set of measurements can be made, the less the bias will have drifted during the measurements and the more accurate the corrected measured components of the gravity vector will be.

One single axis gimbal 512 with one single axis accelerometer 510 can be used to measure the components of the local gravity vector in two directions, e.g. x and z, as well as the bias in the single axis accelerometer 512. As above, placing a second absolute vector gravimeter 500 oriented orthogonally to the first correspondingly allows measurement of the complete local gravity vector as well as correcting for the bias in both single axis accelerometers 512.

Several embodiments have been described herein and those of skill in the art will now recognize that it is possible to combine them to achieve the desired result of measuring the local gravity vector in a variety of conditions and for a variety of uses. For example, for use as a backpack instrument a single gimbal device may be preferable due to portability issues while a vehicle mounted implementation may prefer to use two or more gimbals for redundancy. A terrestrial application can assume a particular orientation for the dominant portion of the local gravity signal while a spacecraft system cannot make that assumption.

The invention claimed is:

1. An absolute vector gravimeter comprising:
   a base;
   a first single axis gimbal operatively connected to the base, the first single axis gimbal being configured to slew through an angle of at least 180 degrees;
   a first single axis accelerometer operatively connected to the first single axis gimbal; and
   a second single axis gimbal attached to the base, the second single axis gimbal being configured to slew through at least 180 degrees;
   a second single axis accelerometer attached to the second single axis gimbal; and
   a processor electrically connected to the first single axis gimbal, the first single axis accelerometer, the second single axis gimbal, and the second single axis accelerometer,
   wherein, in response to rotation signals from the processor, the first single axis gimbal is rotatable to point the first single axis accelerometer in a first direction along a first axis of measurement, the first single axis gimbal is further rotatable to point the first single axis accelerometer in a second direction, wherein the second direction is oriented at an angle of 180 degrees to the first direction, wherein the first and second directions point in opposite directions along the first axis of measurement, and the first single axis gimbal is further rotatable to point the first single axis accelerometer in a third direction along a second axis of measurement, the second axis of measurement being perpendicular to the first axis of measurement;
   wherein the first single axis accelerometer is operable to take a first measurement of a first component of a non-ballistic acceleration vector when pointed in the first direction, the first single axis accelerometer is operable to take a second measurement of a second component of the non-ballistic acceleration vector when pointed in the second direction, and the first single axis accelerometer is operable to take a third measurement when pointed in the third direction;
   wherein, in response to rotation signals from the processor, the second single axis gimbal is rotatable to point the second single axis accelerometer in a fourth direction along a third axis of measurement, and the second single axis gimbal is rotatable to point the second single axis accelerometer in a fifth direction along the third axis of measurement, wherein the fifth direction is oriented at an angle of 180 degrees to the fourth direction;
   wherein the second single axis accelerometer is operable to take a fourth measurement when pointed in the fourth direction and to take a fifth measurement when pointed in the fifth direction; and
   the processor is configured to:
   i. generate the rotation signals to rotate the first single axis gimbal and the second single axis gimbal;
   ii. receive first accelerometer measurement signals from the first single axis accelerometer;
   iii. receive second accelerometer measurement signals from the second single axis accelerometer; and
   iv. use the first accelerometer measurement signals and the second accelerometer measurements signals to determine three de-biased non-ballistic acceleration components by
      determining a first estimated bias in the first single axis accelerometer using the first and second measurements;
      determining a first estimated non-ballistic acceleration component along the first axis of measurement using the first and second measurements;
      determining a second estimated non-ballistic acceleration component along the second axis of measurement using the third measurement and the first estimated bias; and
      determining a third estimated non-ballistic acceleration component along the third axis of measurement and a second estimated bias in the second single axis accelerometer using the fourth measurement and the fifth measurement.

2. The absolute vector gravimeter of claim 1 wherein:
   i. the second single axis gimbal is further rotatable to point the second single axis accelerometer in a sixth direction along a fourth axis of measurement, wherein the fourth axis of measurement is perpendicular to the third axis of measurement;
   ii. the second single axis accelerometer is further operable to take a sixth measurement when pointed in the sixth direction; and
   iii. the processor is configured to determine a fourth estimated non-ballistic acceleration component along the fourth axis of measurement using the sixth measurement and the second estimated bias.

3. The absolute vector gravimeter of claim 2 wherein the first measurement axis and the third measurement axis are co-axial, wherein the first estimated non-ballistic acceleration component and the third estimated non-ballistic acceleration component provide redundant checks for one another.

4. The absolute vector gravimeter of claim 2 wherein three of the measurement axes are perpendicular to each other, wherein the processor is configured to calculate an estimated non-ballistic acceleration component along each of the 3 perpendicular axes, wherein the processor is configured to combine the estimated non-ballistic acceleration components along each of the three perpendicular axes into a resultant non-ballistic acceleration vector.

5. The absolute vector gravimeter of claim 1 wherein the processor is further configured to control the first single axis gimbal, second single axis gimbal, first single axis accelerometer and second single axis accelerometer to repeat each measurement a plurality of times and to combine the estimated non-ballistic acceleration components from all the measurement cycles, thereby reducing the effect of noise on the estimated non-ballistic acceleration components.

6. The absolute vector gravimeter of claim 1, wherein the processor is connected to the first single axis accelerometer by a hard-wired connection, thereby limiting the range of angles through which the first single axis gimbal is capable of rotating.

7. The absolute vector gravimeter of claim 6, further comprising an angle sensor for measuring at least one of: (i) an angular orientation of the first single axis accelerometer, and (ii) angular speed of the first single axis accelerometer when the first single axis gimbal is slewing, wherein:
the first single axis accelerometer is operable to take a centripetal acceleration component measurement when the first single axis gimbal is slewing; and
the processor is configured to:
calculate an expected value of the centripetal acceleration component measurement using known geometric characteristics of the absolute vector gravimeter and an angle sensor measurement;
compare the centripetal acceleration component measurement to the expected value of the centripetal acceleration component measurement in order to obtain an end-to-end calibration for the gain of the absolute vector gravimeter; and
correct the first measured acceleration using the end-to-end calibration.

8. An absolute vector gravimeter for measuring at least one component of a non-ballistic acceleration vector, the absolute vector gravimeter comprising:
a first single axis gimbal operatively connected to the base;
a first single axis accelerometer operatively connected to the first single axis gimbal;
a second single axis gimbal operatively connected to the base;
a second single axis accelerometer operatively connected to the second single axis gimbal; and
a processor operatively connected to the first single axis gimbal, to the first single axis accelerometer, to the second single axis gimbal, and to the second single axis accelerometer;
wherein, in response to rotation signals from the processor, the first single axis gimbal is rotatable to at least three different first accelerometer orientations in a first plane;
wherein the first single axis accelerometer is operable to take a static co-planar measurement at each of the at least three first accelerometer orientations;
wherein, in response to rotation signals from the processor, the second single axis gimbal is rotatable to at least two different second accelerometer orientations in a second plane;
wherein the second single axis accelerometer is operable to take a static co-planar measurement at each of the at least two second accelerometer orientations; and
wherein the processor is configured to:
generate the rotation signals to rotate the first single axis gimbal and the second single axis gimbal;
calculate a first estimated non-ballistic acceleration vector component along a first in-plane axis in the first plane, a second estimated non-ballistic acceleration vector component along a second in-plane axis in the first plane wherein the second in-plane axis is perpendicular to the first in-plane axis, and an estimated bias in the first single axis accelerometer, using the measurements from the first single axis accelerometer at each of the at least three first accelerometer orientations; and
calculate a third estimated non-ballistic acceleration vector component along a third axis perpendicular to both the first in-plane axis and the second in-plane axis, and an estimated bias in the second single axis accelerometer using the measurements taken by the second single axis accelerometer in the at least two second accelerometer orientations.

9. The absolute vector gravimeter of claim 8 wherein the at least three different first accelerometer orientations are distributed evenly around 360 degrees.

10. The absolute vector gravimeter of claim 8 wherein the processor is configured to calculate the estimated bias and the corrected measured acceleration along the two in-plane axes in the first plane by fitting a model acceleration signal to the at least three measurements.

11. The absolute vector gravimeter of claim 8 wherein the processor is connected to the first single axis accelerometer by a hard-wired connection that constrains a range of motion of the first single axis gimbal to no more than 360 degrees.

12. A method of measuring at least one component of a non-ballistic acceleration vector comprising:
i. positioning a first single axis accelerometer pointing in a first direction along a first axis of measurement;
ii. using the first single axis accelerometer to take a first measurement in the first direction;
iii. rotating the first single axis accelerometer to point in a second direction, wherein the second direction is oriented at an angle of 180 degrees to the first direction, wherein the first and second directions point in opposite directions along the first axis of measurement;
iv. using the first single axis accelerometer to take a second measurement in the second direction; and
v. using the first and second measurements to calculate an estimated non-ballistic acceleration component along the first axis of measurement;
vi. rotating the first single axis accelerometer to point in a third direction along a second axis of measurement, wherein the second axis of measurement is perpendicular to the first axis of measurement;
vii. using the first single axis accelerometer to take a third measurement in the third direction;
viii. using the third measurement and the first estimated bias to calculate a second estimated non-ballistic acceleration component along the second axis of measurement;
ix. pointing a second single axis accelerometer in a fourth direction along a third axis of measurement;
x. using the second single axis accelerometer to take a fourth measurement in the fourth direction;
xi. rotating the second single axis accelerometer to point in a fifth direction along the third axis of measurement, wherein the fifth direction is oriented at an angle of 180 degrees to the fourth direction;
xii. using the second single axis accelerometer to take a fifth measurement in the fifth direction; and
xiii. using the fourth and fifth measurements to calculate a second estimated bias in the second single axis accelerometer and a third estimated non-ballistic acceleration component along the third axis of measurement.

13. The method of claim 12 further comprising:
i. rotating the second single axis accelerometer to point in a sixth measurement in a sixth direction along a fourth axis of measurement, wherein the fourth axis of measurement is perpendicular to the third axis of measurement;
ii. using the second single axis accelerometer to take a sixth measurement in the sixth direction; and iii. using the sixth measurement and the second estimated bias to calculate a fourth estimated non-ballistic acceleration component along the fourth axis of measurement.

14. The method of claim 13 wherein three of the measurement axes are perpendicular to each other, the method further comprising calculating an estimated non-ballistic acceleration component along each of the three perpendicular axes and combining the three estimated non-ballistic acceleration components into a resultant estimated non-ballistic acceleration vector.

15. The method of claim 14, further comprising calculating a magnitude of the resultant estimated non-ballistic acceleration vector by calculating the square root of the sum of the squares of the three estimated non-ballistic acceleration components.

16. The method of claim 12 further comprising repeating each measurement a plurality of times and combining the estimated non-ballistic acceleration components from all the measurement cycles to generate average estimated non-ballistic acceleration components.

17. A method of measuring at least one component of a non-ballistic acceleration vector using a processor operatively connected to a first single axis gimbal and a second single axis gimbal, the first single axis gimbal having a first single axis accelerometer mounted thereon and the second single axis gimbal having a second single axis accelerometer mounted thereon, the processor being connected to the first single axis accelerometer by a first hard-wired connection and to the second single axis accelerometer by a second hard-wired connection, the method comprising:
   rotating the first single axis gimbal to slew the first single axis accelerometer to at least three different first accelerometer orientations in a first plane;
   operating the first single axis accelerometer to take a static co-planar measurement at each of the at least three first accelerometer orientations; and
   using the measurements from the first single axis accelerometer, calculating a first estimated non-ballistic acceleration component along a first in-plane axis in the first plane, a second estimated non-ballistic acceleration vector component along a second in-plane axis in the first plane wherein the second in-plane axis is perpendicular to the first in-plane axis, and an estimated bias in the first single axis accelerometer;
   rotating the second single axis gimbal to slew the second single axis accelerometer to at least two different second accelerometer orientations in a second plane;
   operating the second single axis accelerometer to take a static co-planar measurement at each of the at least two second accelerometer orientations; and
   using the measurements from the second single axis accelerometer in the at least two second accelerometer orientations, calculating a third estimated non-ballistic acceleration component along a third axis perpendicular to both the first in-plane axis and the second in-plane axis, and an estimated bias in the second single axis accelerometer.

18. The absolute vector gravimeter of claim 1 wherein the first axis of measurement, second axis of measurement, and third axis of measurement are all perpendicular to each other, wherein the processor is configured to calculate an estimated non-ballistic acceleration component along each of the 3 perpendicular axes, wherein the processor is configured to combine the estimated non-ballistic acceleration components along each of the three perpendicular axes into a resultant acceleration vector.

19. The absolute vector gravimeter of claim 8, further comprising an angle sensor for measuring at least one of: (i) an angular orientation of the second single axis accelerometer, and (ii) an angular speed of the second single axis accelerometer when the second single axis gimbal is slewing, wherein:
   the first single axis accelerometer is operable to take a centripetal acceleration component measurement when the first single axis gimbal is slewing; and
   the processor is configured to:
      calculate an expected value of the centripetal acceleration component measurement using known geometric characteristics of the absolute vector gravimeter and an angle sensor measurement;
      compare the centripetal acceleration component measurement to the expected value of the centripetal acceleration component measurement in order to obtain an end-to-end calibration for the gain of the absolute vector gravimeter; and
      correct the first measured acceleration using the end-to-end calibration.

20. The absolute vector gravimeter of claim 8 wherein the first plane and the second plane are perpendicular.

21. The method of claim 12 wherein the first axis of measurement, second axis of measurement, and third axis of measurement are all perpendicular to each other, the method further comprising calculating an estimated non-ballistic acceleration component along each of the 3 perpendicular axes and combining the estimated non-ballistic acceleration components along each of the three perpendicular axes into a resultant acceleration vector.

22. An absolute vector gravimeter comprising:
   a base;
   a plurality of single-axis gimbals mounted to the base;
   a plurality of single-axis accelerometers, each single-axis accelerometer mounted on one of the single-axis gimbals in the plurality of single-axis gimbals; and
   a processor electrically connected to each single-axis gimbal and each single-axis accelerometer;
   wherein, in response to rotation signals from the processor, each single-axis gimbal is rotatable to point the corresponding single-axis accelerometer in a plurality of directions within a corresponding plane;
   wherein each single-axis accelerometer is operable to take a plurality of static measurements, each static measurement taken when the single-axis accelerometer is pointed in one of the directions in the plurality of directions; and
   the processor is configured to:
      generate the rotation signals to rotate each of the single-axis gimbals;
      determine an estimated bias for each of the single-axis accelerometers from the static measurements taken by that single-axis accelerometer when pointed in the plurality of directions; and
      determine three perpendicular components of a non-ballistic acceleration vector from the plurality of static measurements taken by the plurality of single-axis accelerometers.

23. The absolute vector gravimeter of claim 22 wherein:
   a first single axis gimbal in the plurality of single-axis gimbals is rotatable to point a corresponding first single axis accelerometer in at least three different directions in a first plane, and the corresponding first single axis accelerometer is operable to take a static co-planar measurement when pointed in each of the at least three different directions; and the processor is configured to calculate, using the static co-planar measurements from the first single-axis accelerometer:
a first estimated non-ballistic acceleration vector component along a first in-plane axis in the first plane,
a second estimated non-ballistic acceleration vector component along a second in-plane axis in the first plane, wherein the second in-plane axis is perpendicular to the first in-plane axis, and
the estimated bias in the first single axis accelerometer.

24. The absolute vector gravimeter of claim 22 wherein the plane corresponding to each single-axis gimbal is perpendicular to the plane corresponding to each of the other single-axis gimbals in the plurality of single-axis gimbals.

25. The absolute vector gravimeter of claim 1 wherein each of the first measurement, second measurement, third measurement, fourth measurement, and fifth measurement are static measurements.

26. The absolute vector gravimeter of claim 8 wherein the third axis lies on the second plane.

27. The absolute vector gravimeter of claim 8 wherein the processor is configured to calculate a magnitude of the resultant estimated non-ballistic acceleration vector by calculating the square root of the sum of the squares of the three estimated non-ballistic acceleration components.

28. The method of claim 17 wherein the third axis lies on the second plane.

29. The method of claim 17 further comprising calculating a magnitude of the resultant estimated non-ballistic acceleration vector by calculating the square root of the sum of the squares of the three estimated non-ballistic acceleration components.

30. The method of claim 17, further comprising repeating each measurement a plurality of times and combining the estimated non-ballistic acceleration components from all the measurement cycles to generate average estimated non-ballistic acceleration components.

* * * * *